(12) United States Patent
Kim et al.

(10) Patent No.: US 11,398,242 B2
(45) Date of Patent: Jul. 26, 2022

(54) ELECTRONIC DEVICE FOR DETERMINING NOISE CONTROL PARAMETER ON BASIS OF NETWORK CONNECTION INFORMATION AND OPERATING METHOD THEREOF

(71) Applicant: Samsung Electronics Co., Ltd., Gyeonggi-do (KR)

(72) Inventors: Choon-Ho Kim, Gyeonggi-do (KR); Kyuhan Kang, Gyeonggi-do (KR); Minseok Kim, Gyeonggi-do (KR); Gangyoul Kim, Gyeonggi-do (KR); Yang-Su Kim, Gyeonggi-do (KR); Gunhyuk Yoon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 149 days.

(21) Appl. No.: 16/757,940

(22) PCT Filed: Oct. 8, 2018

(86) PCT No.: PCT/KR2018/011809
§ 371 (c)(1),
(2) Date: Apr. 21, 2020

(87) PCT Pub. No.: WO2019/083192
PCT Pub. Date: May 2, 2019

(65) Prior Publication Data
US 2020/0265858 A1    Aug. 20, 2020

(30) Foreign Application Priority Data
Oct. 23, 2017    (KR) .................. 10-2017-0137508

(51) Int. Cl.
*G10L 21/0232*    (2013.01)
*G10L 15/22*    (2006.01)
(Continued)

(52) U.S. Cl.
CPC .......... *G10L 21/0232* (2013.01); *G10L 15/22* (2013.01); *G10L 25/51* (2013.01); *G10L 25/84* (2013.01)

(58) Field of Classification Search
CPC ..... G10L 21/0232; G10L 15/22; G10L 25/51; G10L 25/84
See application file for complete search history.

(56) References Cited

U.S. PATENT DOCUMENTS 9,386,162 B2     7/2016  Yang et al.
9,516,430 B2 *  12/2016  Jensen ................. H04R 25/407
(Continued)

FOREIGN PATENT DOCUMENTS

CA    2577489 A1 *  5/2006  ............. H04L 25/10
CA    2807513 A1 *  4/2012  ............. H04Q 3/625
(Continued)

OTHER PUBLICATIONS

PCT/ISA/210 Search Report dated Jan. 22, 2019 issued on PCT/KR2018/011809, pp. 5.
(Continued)

*Primary Examiner* — Mohammad K Islam
(74) *Attorney, Agent, or Firm* — The Farrell Law Firm, P.C.

(57) ABSTRACT

An electronic device and an operating method thereof for identifying a noise control parameter on the basis of network connection information are provided. The electronic device includes a wireless communication circuit, and a processor. The processor is configured to acquire network connection information of an external electronic device which is call connected, through the wireless communication circuit, identify at least one noise control parameter, on the basis of the acquired network connection information, receive an audio signal from the external electronic device, through the
(Continued)

wireless communication circuit, and suppress a noise in the audio signal, on the basis of the identified at least one noise control parameter.

17 Claims, 8 Drawing Sheets

(51) Int. Cl.
*G10L 25/51* (2013.01)
*G10L 25/84* (2013.01)

(56) References Cited

U.S. PATENT DOCUMENTS

| | | |
|---|---|---|
| 2004/0001599 A1 | 1/2004 | Etter et al. |
| 2005/0014487 A1 | 1/2005 | Kobayashi et al. |
| 2008/0084917 A1* | 4/2008 | Sung ............... H04B 1/719 375/130 |
| 2014/0187276 A1* | 7/2014 | Cyzs ............... H04J 11/0023 455/501 |
| 2015/0222988 A1 | 8/2015 | Sorensen |
| 2015/0319298 A1 | 11/2015 | Corretjer et al. |

FOREIGN PATENT DOCUMENTS

| | | | | |
|---|---|---|---|---|
| DE | 69934066 T2 | * | 4/2007 | .......... H04M 7/1275 |
| JP | 1032871 | | 2/1998 | |
| JP | 2001320289 | | 11/2001 | |
| JP | 2004254261 A | * | 9/2004 | .............. H04M 3/40 |
| JP | 3591068 B2 | * | 11/2004 | .......... G10L 21/0208 |
| JP | 2012-080494 | | 4/2012 | |
| JP | 5595726 B2 | * | 9/2014 | .............. H03F 3/217 |
| KR | 1020010037906 | | 5/2001 | |
| KR | 1020070014980 | | 2/2007 | |
| WO | WO-9905831 A1 | * | 2/1999 | .......... G10L 21/0208 |
| WO | WO-03043298 A1 | * | 5/2003 | .............. H04M 3/30 |
| WO | WO-2021022052 A1 | * | 2/2021 | .............. G10L 15/22 |
| WO | WO-2021041182 A1 | * | 3/2021 | .............. G06N 3/08 |

OTHER PUBLICATIONS

Korean Office Action dated Jan. 12, 2022 issued in counterpart application No. 10-2017-0137508, 21 pages.
KR Notice of Patent Grant dated Jun. 9, 2022 issued in counterpart application No. 10-2017-0137508, 4 pages.

* cited by examiner ically and claims priority to Korean Patent

ELECTRONIC DEVICE FOR DETERMINING NOISE CONTROL PARAMETER ON BASIS OF NETWORK CONNECTION INFORMATION AND OPERATING METHOD THEREOF

PRIORITY

This application is a National Phase Entry of PCT International Application No. PCT/KR2018/011809, which was filed on Oct. 8, 2018, and claims priority to Korean Patent Application No. 10-2017-0137508, which was filed on Oct. 23, 2017, the content of each of which are incorporated herein by reference.

BACKGROUND

1. Field

Various embodiments of the present disclosure relate to an electronic device for suppressing a noise of an audio signal and an operating method thereof.

2. Background

With the growth of information telecommunication technologies and semiconductor technologies, various electronic devices are developing into multimedia devices providing various multimedia services. For example, the electronic service can provide various services such as a voice call service, a message service, a broadcasting service, a wireless Internet service, a camera service, a music play service, and a game service by using an application installed in the electronic device.

To guarantee a quality of a voice signal during a call, the electronic device can suppress a noise in an audio signal received from an external electronic device.

SUMMARY

By using a noise suppressor, an electronic device can suppress a noise signal in an audio signal received from an external electronic device during a call. The noise suppressor can use a fixed noise suppression parameter that is preset on the basis of a specific noise sound source. Because the noise suppressor uses the noise suppression parameter that is fixedly set on the basis of the specific noise sound source, there is a problem of, when another noise sound source is generated, not being able to suppress the generated another noise sound source.

The electronic device can perform a call connection with another electronic device through a homogeneous and/or heterogeneous network. The electronic device can receive an audio signal including a noise generated by a homogeneous and/or heterogeneous network during a call with another electronic device.

To solve the above-described problem, various embodiments of the present disclosure provide a method and apparatus for suppressing a noise in an audio signal received during a call, on the basis of network connection information in an electronic device.

SUMMARY

According to various embodiments of the present disclosure, an electronic device includes a wireless communication circuit, and a processor. The processor is configured to acquire network connection information of an external electronic device which is call connected, through the wireless communication circuit, identify at least one noise control parameter, on the basis of the acquired network connection information, receive an audio signal from the external electronic device, through the wireless communication circuit, and suppress a noise in the audio signal, on the basis of the identified at least one noise control parameter.

According to various embodiments of the present disclosure, a method for operating in an electronic device includes acquiring network connection information of an external electronic device which is call connected, identifying at least one noise control parameter, on the basis of the acquired network connection information, receiving an audio signal from the external electronic device, and suppressing a noise in the audio signal, on the basis of the identified at least one noise control parameter.

According to various embodiments of the present disclosure, a computer-readable recording medium includes a program for executing acquiring network connection information of an external electronic device which is call connected, identifying at least one noise control parameter, on the basis of the acquired network connection information, receiving an audio signal from the external electronic device, and suppressing a noise in the audio signal, on the basis of the identified at least one noise control parameter.

An electronic device according to various embodiments of the present disclosure may adaptively set a parameter for noise suppression and suppress a noise of an audio signal, on the basis of network connection information of another electronic device that is in call connection, thereby providing a voice signal of an improved quality, regardless of a network connection kind of the another electronic device that is during a call.

DETAILED DESCRIPTION

Figure 1:
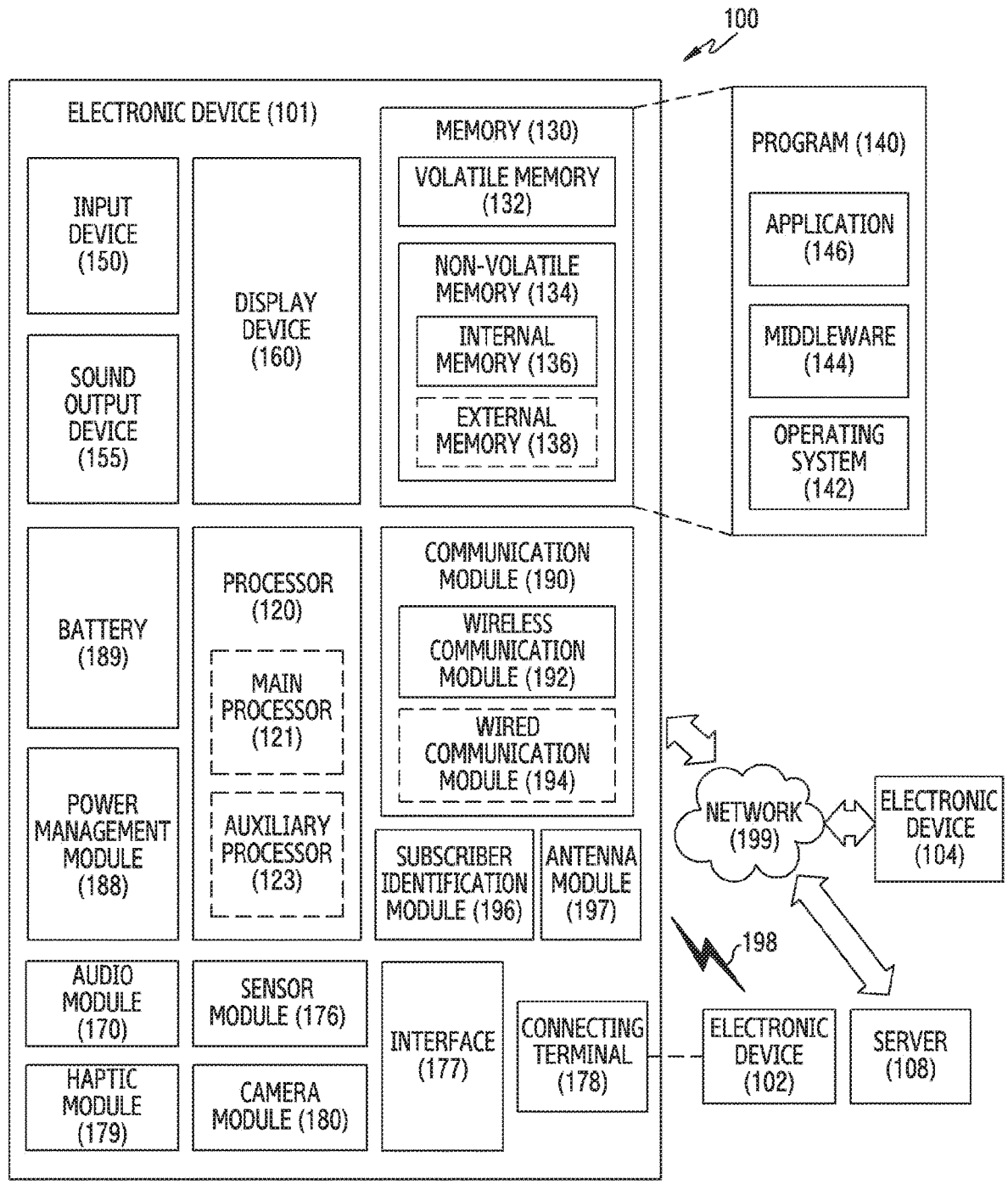
FIG. 1 is a block diagram of an electronic device for identifying a noise control parameter, based on network connection information within a network environment according to various embodiments of the present disclosure.

Hereinafter, various embodiments of the present disclosure will be described with reference to the accompanying drawings. The examples and terms used herein are not intended to limit the techniques described in this document to specific embodiments, but should be understood to include various modifications, equivalents, and/or alternatives to the examples. In connection with the description of the drawings, similar reference numerals may be used for similar components. Singular expressions may include plural expressions unless the context clearly indicates otherwise.

FIG. 1 is a block diagram of an electronic device for identifying a noise control parameter, based on network connection information within a network environment according to various embodiments of the present disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
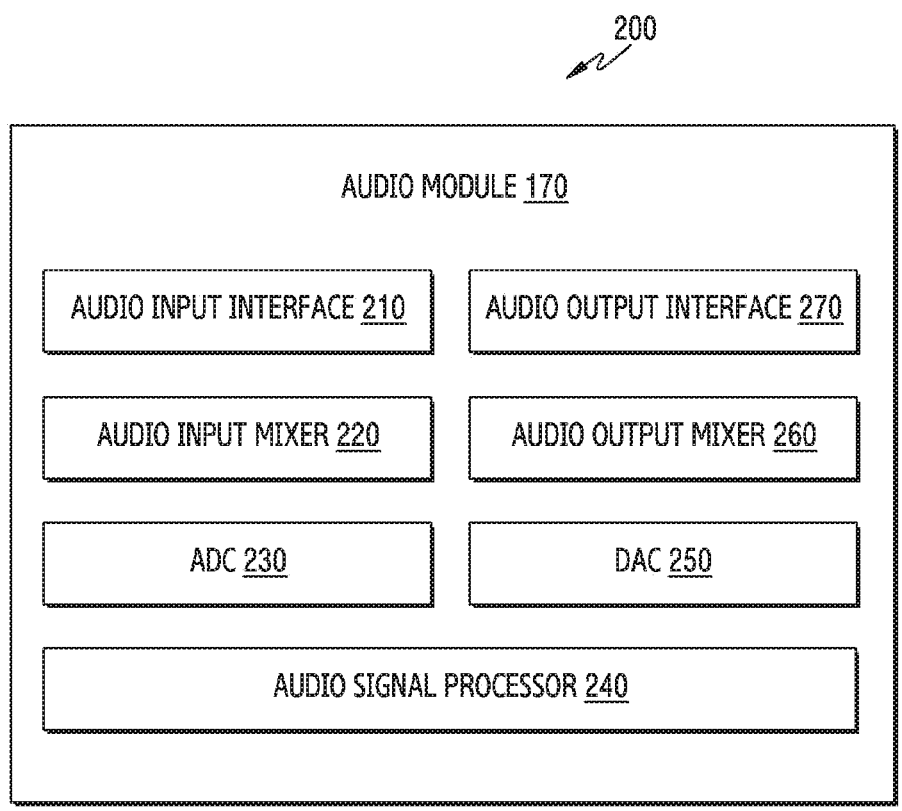
FIG. 2 is a block diagram of an audio module for identifying a noise control parameter, based on network connection information according to various embodiments of the present disclosure.

FIG. 2 is a block diagram 200 illustrating the audio module 170 according to an embodiment of the disclosure.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal. The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the processor 120 may drive software included in the memory 130, to control at least one another component of the electronic device 101 connected to the processor 120.

According to various embodiments, the processor 120 may transmit and/or receive a signal for call connection with another electronic device, through the communication module 190. According to an embodiment, the processor 120 may perform a negotiation procedure for call connection with another electronic device, through the communication module 190. The processor 120 may acquire at least one of network connection information of the electronic device or network connection information of another electronic device during the negotiation procedure, and may store the acquired network connection information in the memory 130. The network connection information may, for example, include at least one of a network kind being in access, a sampling rate, or channel information. The network kind may include, for instance, at least one of a 2-Generation (2G) network, a 3-Generation (3G) network, a WiFi network, a voice over long term evolution (VoLTE) network, or a 5-Generation (5G) network.

According to various embodiments, the processor 120 may identify at least one noise control parameter, on the basis of network connection information. For example, the processor 120 may identify at least one of a parameter of a noise suppressor or a parameter of an automatic gain controller. According to an embodiment, the processor 120 may identify the at least one noise control parameter corresponding to the network connection information, on the basis of a noise control parameter table previously stored in the memory 130. The noise control parameter table may include information of at least one noise control parameter corresponding to each network connection information. According to an embodiment, the noise control parameter table may include a noise control parameter dependent on network connection information of an external electronic device connected to the electronic device. For example, the noise control parameter table may be configured in a form in which "network kind of external electronic device: 2G" and "parameter of noise suppressor: first value" are associated, and "network kind of external electronic device: 3G" and "parameter of noise suppressor: second value" are associated, and "network kind of external electronic device: WiFi" and "parameter of noise suppressor: third value" are associated, and "network kind of external electronic device: VoLTE" and "parameter of noise suppressor: fourth value" are associated and stored. For another example, the noise control parameter table may be configured in a form in which "network kind of external electronic device: 2G" and "parameter of noise suppressor: first value and parameter of automatic gain controller: first gain value" are associated, and "network kind of external electronic device: 3G" and "parameter of noise suppressor: second value and parameter of automatic gain controller: second gain value" are associated, and "network kind of external electronic device: WiFi" and "parameter of noise suppressor: third value and parameter of automatic gain controller: third gain value" are associated, and "network kind of external electronic device: VoLTE" and "parameter of noise suppressor: fourth value and parameter of automatic gain controller: fourth gain value" are associated and stored. According to an embodiment, the noise control parameter table may include a noise control parameter dependent on network connection information of the electronic device and network connection information of an external electronic device connected to the electronic device. For instance, the noise control parameter table may include a noise control parameter dependent on a combination of a network kind of the electronic device and a network kind of the external electronic device. For instance, in response to it being identified that a network kind of another electronic device that is in call connection being "WiFi", the processor 120 may identify the "parameter of noise suppressor: first value" or the "parameter of noise suppressor: first value and parameter of automatic gain controller: first gain value", as the noise control parameter, on the basis of the noise control parameter table previously stored in the memory 130. The noise control parameter table may be previously set by a designer and be stored in the memory 130. According to an embodiment, at least one noise control parameter may be set on the basis of a reference noise level (e.g., about −96 decibel (dB)). The reference noise level may be different by service provider, or country. For example, a parameter of a noise suppressor may be set as a value capable of reducing a level of a network noise included in an audio signal to the reference noise level. The network noise may be a noise that is formed by a negotiation policy of a service provider on an audio codec, or a transcoding noise. According to an embodiment, the network noise may be dependent on a network kind of an external electronic device that is during a call. For example, in response to the network kind of the external electronic device that is during a call being "WiFi", the network noise of the audio signal received to the electronic device 101 may be about −78 dB. In response to the network kind of the external electronic device that is during a call being "VoLTE", the network noise of the audio signal received to the electronic device 101 may be about −85 dB. On the basis of the above-described characteristic, a parameter of a noise suppressor related to the "network kind: WiFi" may, for example, be set as about −18 dB. For instance, the parameter of the noise suppressor related to the "network kind: WiFi" may be set as about −18 dB such that the network noise of about −78 dB becomes the reference noise level of about −96 dB. For another example, the parameter of the noise suppressor related to the "network kind: VoLTE" may be set as about −11 dB. For instance, the parameter of the noise suppressor related to the "network kind: VoLTE" may be set as about −11 dB such that the network noise of about −85 dB becomes the reference noise level of about −96 dB.

According to various embodiments, while being call connected with another electronic device, the processor 120 may receive an audio signal through the communication module 190. According to an embodiment, the processor 120 may process the received audio signal through the audio module 170. According to an embodiment, the processor 120 may control the audio module 170 to select any one of at least one noise control parameter that is identified on the basis of network connection information, and a preset default noise control parameter, on the basis of a level of a noise included in the received audio signal, and suppress the noise of the received audio signal by using the selected noise control parameter. The default noise control parameter may include at least one of a default noise control parameter of a noise suppressor that is preset on the basis of a near-end noise, or a default noise control parameter of an automatic gain controller. The near-end noise may refer to a noise which is inputted to a microphone of another electronic device that is in call connection.

Through the audio module 170, the processor 120 may divide the received audio signal into a voice signal section and a noise signal section (or a silence signal section), and measure a noise level of the noise signal section. Through the audio module 170, the processor 120 may compare the measured noise level and a preset threshold level, to identify the kind (or type) of a noise of the corresponding noise signal section. For instance, the processor 120 may compare the measured noise level and the preset threshold level, to identify whether the noise of the corresponding noise signal section is a near-end noise or is a network noise. In response to the measured noise level being greater than the threshold level, the processor 120 may identify the noise of the corresponding noise signal section as the near-end noise. In response to the measured noise level being less than or being equal to the threshold level, the processor 120 may identify the noise of the corresponding noise signal section as the network noise. In response to it being identified that the noise of the corresponding noise signal section is the near-end noise, the processor 120 may control the audio module 170 to suppress the noise by using a default noise control parameter. According to an embodiment, in response to it being identified that the noise of the corresponding noise signal section is the network noise, the processor 120 may control the audio module 170 to suppress the noise by using at least one noise control parameter identified on the basis of network connection information.

According to various embodiments, the processor 120 may refine the noise control parameter table stored in the memory 130. According to an embodiment, the processor 120 may refine at least one noise control parameter included in the noise control parameter table, on the basis of at least one of a noise level of an audio signal received from another electronic device, a noise level of an audio signal outputted from the noise suppressor of the audio module 170, the reference noise level (e.g., −96 dB), or network connection information of another electronic device. For example, the processor 120 may compare the noise level of the audio signal outputted from the noise suppressor of the audio module 170 and the reference noise level, to refine the at least one noise control parameter included in the noise control parameter table. The processor 120 may refine the at least one noise control parameter included in the noise control parameter table, on the basis of a difference between a noise level of a noise signal section corresponding to a network noise in the audio signal outputted from the noise suppressor and the reference noise level. For instance, in response to a parameter of a first noise suppressor acquired on the basis of network connection information being about −18 dB, and a noise level of a noise signal section corresponding to a network noise in an audio signal outputted from the first noise suppressor being about −95 dB, and the reference noise level being about −96 dB, the processor 120 may add a difference of about −1 dB between the noise level of about −95 dB of the noise signal section corresponding to the network noise and the reference noise level of about −96 dB, to the parameter of the first noise suppressor, to refine a parameter value of the first noise suppressor into about −dB. According to an embodiment, the processor 120 may refine at least one noise control parameter related to network connection information of another electronic device, on the basis of an average value of noise levels of a network section in an audio signal received from another electronic device and a reference noise level. For example, in response to the average value of the noise levels of the network section in the audio signal received from the another electronic device being about −79 dB, and the reference noise level being about −96 dB, the processor 120 may set a difference of about −17 dB between the average value of −79 dB and the reference noise level of about −96 dB, as a parameter value of a noise suppressor related to the network connection information of another electronic device.

According to various embodiments, the memory 130 may store network connection information according to the control of the processor 120. For example, the memory 130 may store at least one of network connection information of the electronic device 101, or network connection information of an external electronic device that is in call connection. According to an embodiment, the memory 130 may store a noise control parameter table. The noise control parameter table may be previously stored by a designer. The noise control parameter table may represent a noise control parameter corresponding to each of a plurality of network connection information. According to various embodiments, the audio module 170 may process an audio signal received from the external electronic device through the communication module 190. According to an embodiment, the audio module 170 may suppress a noise of the audio signal by using an audio signal processor (e.g., the audio signal processor 240).

According to various embodiments, the communication module 190 may be at least one wireless communication circuit. The communication module 190 may communicate with another electronic device or server that is wirelessly or wiredly connected with the electronic device. According to an embodiment, the communication module 190 may transmit and/or receive a signal for call connection with another electronic device. For example, the communication module 190 may transmit and/or receive a negotiation related signal for call connection with another electronic device. The communication module 190 may receive an audio signal from another electronic device which is call connected with the electronic device.

Figure 3:
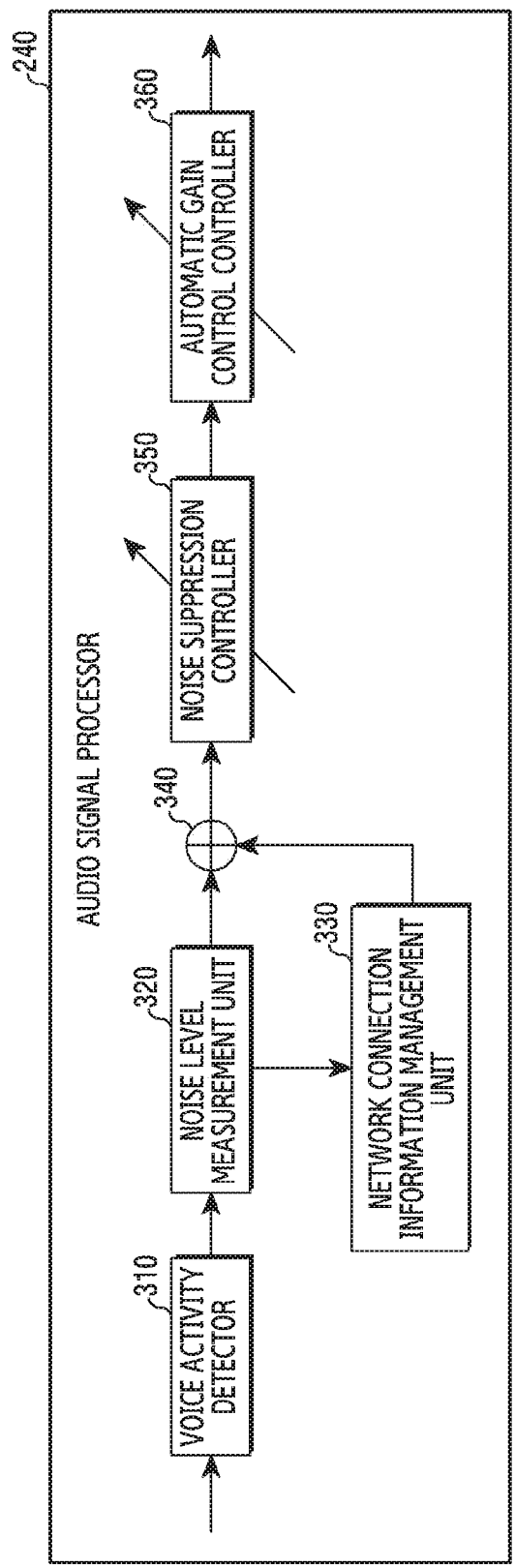
FIG. 3 is a block diagram of an audio signal processor according to various embodiments of the present disclosure.
Figure 4:
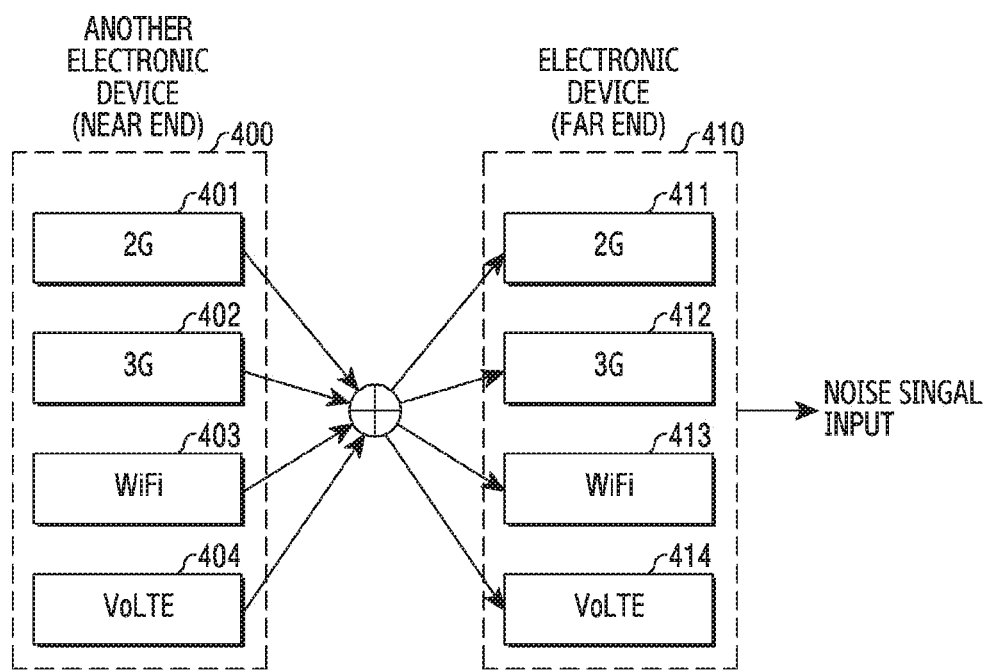
FIG. 4 illustrates a network connection scheme between an electronic device and another electronic device according to various embodiments of the present disclosure.
Figure 5:
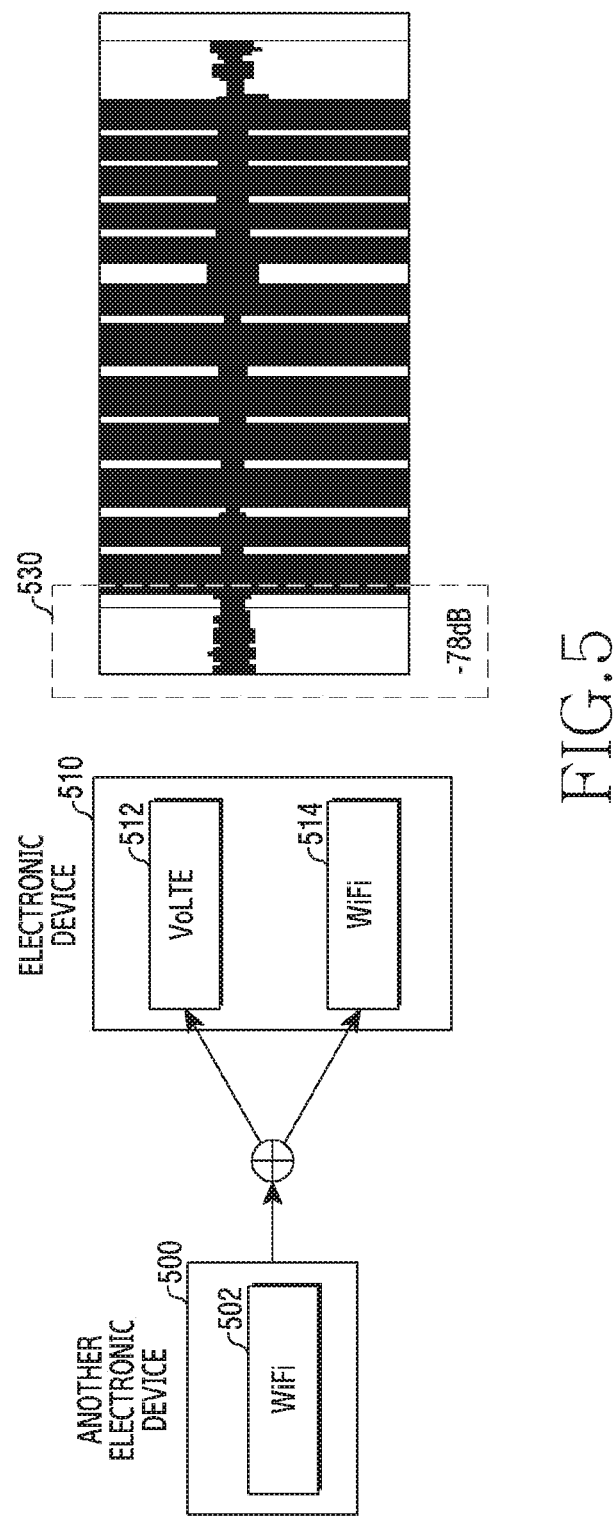
FIGS. 5 and 6 illustrate a noise level of an audio signal dependent on a network connection scheme of another electronic device being in call connection in an electronic device according to various embodiments of the present disclosure.
Figure 6:
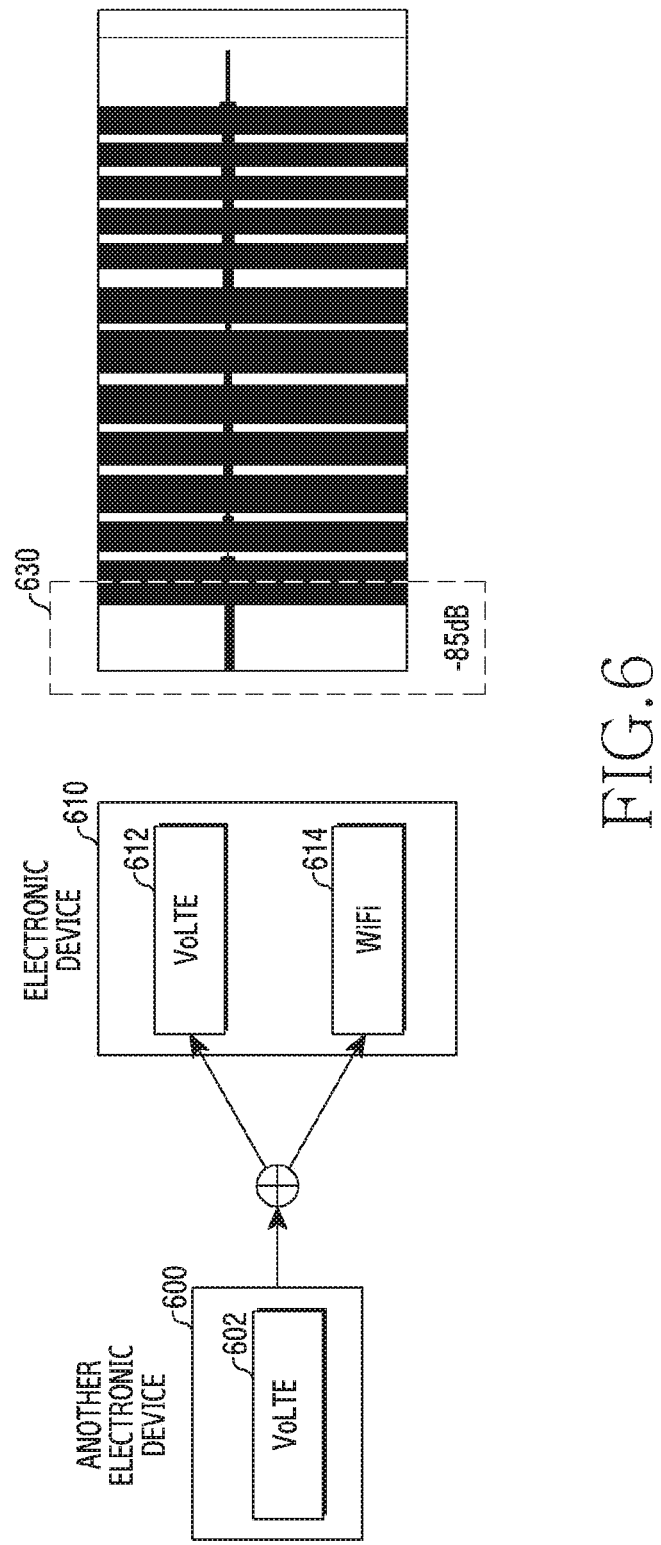

FIG. 3 is a block diagram of the audio signal processor 240 according to various embodiments of the present disclosure. The audio signal processor 240 of FIG. 3 may be the audio signal processor 240 illustrated in FIG. 2. Below, the audio signal processor 240 of FIG. 3 is described with reference to FIG. 4, FIG. 5 and FIG. 6. FIG. 4 illustrates a network connection scheme between an electronic device and another electronic device according to various embodiments of the present disclosure. FIGS. 5 and 6 illustrate a noise level of an audio signal dependent on a network connection scheme of another electronic device being in call connection in an electronic device according to various embodiments of the present disclosure. According to various embodiments, the audio signal processor 240 may be provided as part of the processor 120.

Referring to FIG. 3, the audio signal processor 240 may include a voice activity detector (VAD) 310, a noise level measurement unit 320, a network connection information management unit 330, an adder 340, a noise suppression controller 350, and an automatic gain control controller 360. In some embodiment, the audio signal processor 240 may omit at least one of the components or additionally have another component.

According to various embodiments, the voice activity detector (VAD) 310 may divide an inputted audio signal into a voice signal section and a noise (or silence) signal section. For example, the voice activity detector 310 may divide the voice signal section and the noise signal section by using various voice activity detection schemes widely known to the art. The present disclosure is not limited to a specific voice activity detection scheme. The voice activity detector 310 may provide the noise level measurement unit 320 with a signal including information indicating whether the inputted audio signal is the voice signal section or is the noise signal section.

According to various embodiments, the noise level measurement unit 320 may measure a noise level of the inputted audio signal, on the basis of a signal provided from the voice activity detector 310. According to an embodiment, the noise level measurement unit 320 may identify the noise signal section in the audio signal on the basis of the signal provided from the voice activity detector 310, and identify a noise level on the basis of at least one of an energy level of the identified noise signal section or a frequency. According to an embodiment, the noise level measurement unit 320 may output, to the adder 340, a signal which includes information indicating the noise level measured for the noise signal section. According to an embodiment, the noise level measurement unit 320 may output an output request signal for network connection information, to the network connection information management unit 330.

According to various embodiments, the network connection information management unit 330 may acquire and manage network connection information of another electronic device which is call connected with the electronic device (e.g., the electronic device 101). According to an embodiment, the network connection information management unit 330 may acquire network connection information indicating that the electronic device 101 is connected with another electronic device through a homogeneous network or heterogeneous network. For example, as illustrated in FIG. 4, another electronic device 400 and an electronic device 410 (e.g., the electronic device 101) each may use any one of 2G (401, 411), 3G (402, 412), WiFi (403, 413), or VoLTE (404, 414). For instance, the electronic device 410 may be connected to the 2G network (411), and the another electronic device 400 may be connected to the VoLTE network (404). The network connection information management unit 330 may acquire, store and manage network connection information which indicates the above network connection states of the electronic device 410 and another electronic device 400. According to an embodiment, in response to an output request signal for network connection information being received from the noise level measurement unit 320, the network connection information management unit 330 may output a signal including the network connection information to the adder 330. For example, the network connection information management unit 330 may provide the adder 330 with at least one of network connection information of the electronic device or network connection information of another electronic device that is in call connection with the electronic device. For instance, the network connection information management unit 330 may output, to the adder 340, a signal which includes at least one information among information indicating that a network kind of the electronic device is 3G and information indicating that a network kind of another electronic device being in call connection with the electronic device is WiFi. According to an embodiment, the network connection information management unit 330 may output, to the adder 340, a signal including at least one of a sampling rate or channel related information together with a network kind. According to an embodiment, transmitting the network connection information from the network connection information management unit 330 to the adder 340 may be once performed at a timing at which the electronic device and another electronic device are call connected with each other.

According to various embodiments, the adder 340 may provide the noise suppression controller 350 with a signal including noise level information provided from the noise level measurement unit 320. According to an embodiment, in response to the signal including the noise level information being received from the noise level measurement unit 320 and the signal including the network connection information being received from the network connection information management unit 330, the adder 340 may provide the received signals including the noise level information and the network connection information, to the noise suppression controller 350.

According to various embodiments, the noise suppression controller 350 may include a noise suppressor for suppressing a noise by using a noise control parameter, which is identified adaptively according to network connection information and a noise level. According to an embodiment, the noise suppression controller 350 may identify a parameter of the noise suppressor on the basis of a signal provided from the adder 340, and apply the identified parameter to the noise suppressor, to perform noise suppression. According to an embodiment, the noise suppression controller 350 may compare a noise level with a threshold level, to identify the kind (or type) of a noise of a corresponding noise signal section. For example, the noise suppression controller 350 may compare a noise level of each noise signal section and the threshold level, to identify whether each noise signal section is a near-end noise or is a network noise. In response to a noise level of a specific noise signal section being greater than the threshold level, the noise suppression controller 350 may identify a noise of the specific noise signal section as the near-end noise. In response to the noise level of the specific noise level being less than or being equal to the threshold level, the noise suppression controller 350 may identify the noise of the specific noise signal section as the network noise.

According to an embodiment, the noise suppression controller 350 may identify a default noise control parameter for the section identified as the near-end noise, and may identify a noise control parameter corresponding to network connection information for the section identified as the network noise. For example, the noise suppression controller 350 may identify at least one noise control parameter corresponding to the network connection information, on the basis of a noise control parameter table stored in the memory 130.

According to an embodiment, the noise suppression controller 350 may suppress a noise for a corresponding noise signal section of an audio signal by using the identified noise control parameter. For example, the noise suppression controller 350 may apply a default noise control parameter to a noise signal section whose noise level is greater than a threshold level, and apply a noise control parameter corresponding to network connection information to a section whose noise level is less than or is equal to the threshold level, to suppress a noise.

According to an embodiment, the noise suppression controller 350 may identify a noise control parameter in consideration of only network connection information of another electronic device that is call connected with an electronic device, irrespective of network connection information of the electronic device. For instance, because a network noise may depend on a network kind of an external electronic device that is call connected with the electronic device, according to an embodiment, the noise suppression controller 350 may identify the noise control parameter in consideration of only the network connection information of another electronic device that is in call connection with the electronic device (e.g., the electronic device 101). For example, as illustrated in FIG. 5, in response to a network kind of another electronic device 500 being WiFi (502), an electronic device 510 (e.g., the electronic device 101) may receive an audio signal having a noise signal section 530 whose network noise level is about −78 dB, regardless of a network kind of the electronic device 510. For instance, all in response to the electronic device 510 using VoLTE (512) and another electronic device 500 using WiFi (502), and in response to the electronic device 510 using WiFi (514) and another electronic device 500 using WiFi (502), the electronic device 510 may receive an audio signal including a network noise of about −78 dB. For another example, as illustrated in FIG. 6, in response to a network kind of another electronic device 600 being VoLTE (602), an electronic device 610 (e.g., the electronic device 101) may receive an audio signal having a noise signal section 630 whose network noise level is about −85 dB, regardless of a network kind of the electronic device 610. For instance, all in response to the electronic device 610 using VoLTE (612) and another electronic device 600 using VoLTE (602), and in response to the electronic device 610 using WiFi (614) and another electronic device 600 using VoLTE (602), the electronic device 610 may receive an audio signal including a network noise of about −85 dB. By considering the above-described characteristic, the noise suppression controller 350 according to an embodiment of the present disclosure may identify a noise control parameter in consideration of only network connection information of another electronic device that is during a call with the electronic device. For instance, in response to network connection information being "network kind of external electronic device: WiFi", the noise suppression controller 350 may search the noise control parameter table for a parameter of the noise suppressor corresponding to the "network kind of external electronic device: WiFi". According to an embodiment, a parameter value of the noise suppressor in response to the network kind of the external electronic device being WiFi may be a value for adjusting a network noise of a WiFi network to a reference noise level. For example, as illustrated in FIG. 5, in response to a network noise level of the WiFi network being about −78 dB, the parameter value of the noise suppressor may be set as a value (e.g., about −18 dB) for adjusting a noise of about −78 dB to the reference noise level (e.g., about −96 dB). The network noise level numerical values illustrated in FIG. 5 and FIG. 6 are exemplary and may be different according to an environment. For example, the network noise level numerical value may be different according to a service provider policy. Accordingly, according to an embodiment, the parameter value of the noise suppressor may be set as a different value for adjusting the network noise level to the reference noise level.

According to various embodiments, the automatic gain control controller 360 may include an automatic gain controller. The automatic gain controller may control an output amplitude by using a noise control parameter that is identified adaptively according to network connection information and a noise level. According to an embodiment, the automatic gain control controller 360 may receive an audio signal and the network connection information from the noise suppression controller 350. The audio signal received from the noise suppression controller 350 may be an audio signal of which the near-end noise and/or network noise are suppressed through the noise suppressor. The automatic gain control controller 360 may identify a parameter of the automatic gain controller on the basis of the network connection information, and apply the identified parameter of the automatic gain controller to the automatic gain controller, to control the output amplitude. For example, the automatic gain control controller 360 may identify the parameter of the automatic gain controller corresponding to the network connection information, on the basis of the noise control parameter table stored in the memory (e.g., the memory 130).

According to various embodiments of the present disclosure, an electronic device may include a wireless communication circuit, and a processor. The processor may be configured to acquire network connection information of an external electronic device which is call connected, through the wireless communication circuit, identify at least one noise control parameter, on the basis of the acquired network connection information, receive an audio signal from the external electronic device, through the wireless communication circuit, and suppress a noise in the audio signal, on the basis of the identified at least one noise control parameter.

According to various embodiments of the present disclosure, the network connection information of the external electronic device may include at least one of a network kind, a sampling rate, or channel information.

According to various embodiments of the present disclosure, the processor may be configured to perform a negotiation procedure for call connection with the external electronic device, through the wireless communication circuit, and acquire the network connection information of the external electronic device from at least one signal which is transmitted and/or received during the negotiation procedure.

According to various embodiments of the present disclosure, the at least one noise control parameter may include at least one of a parameter for noise suppression or a parameter for automatic gain control.

According to various embodiments of the present disclosure, the electronic device may further include a memory, and the processor may be configured to identify, as the at least one noise control parameter, at least one of a plurality of noise control parameters corresponding to a plurality of network connection information stored in the memory.

According to various embodiments of the present disclosure, the processor may be configured to divide the audio signal received from the external electronic device, into a voice section and a noise signal section, measure a noise level of the noise signal section, and in response to the noise level satisfying a given level, suppress a noise in the audio signal, on the basis of the at least one noise control parameter.

According to various embodiments of the present disclosure, the processor may be configured to, in response to the measured noise level not satisfying the given level, suppress the noise in the audio signal, on the basis of a preset default noise control parameter.

According to various embodiments of the present disclosure, the processor may be configured to identify the at least one noise control parameter, on the further basis of network connection information of the electronic device.

Figure 7:
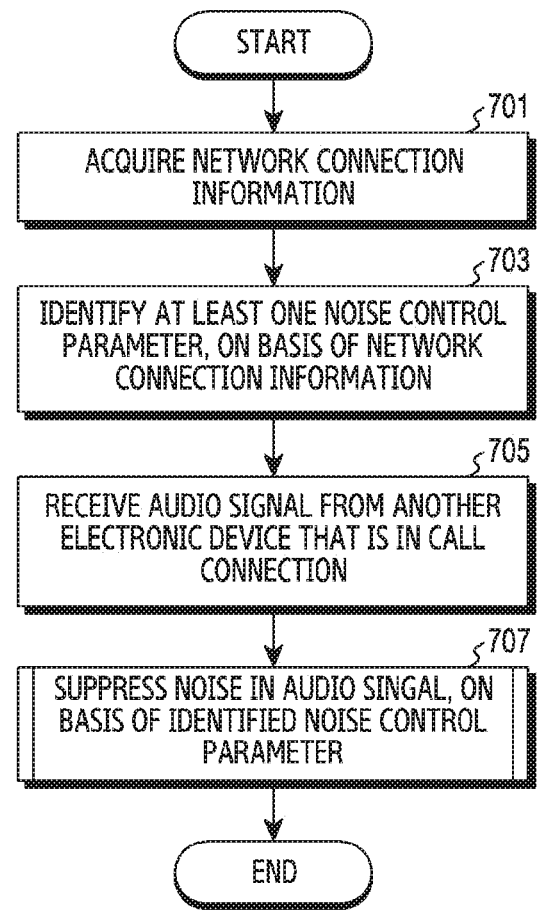
FIG. 7 is a flowchart of suppressing a noise of an audio signal in an electronic device according to various embodiments of the present disclosure.

FIG. 7 is a flowchart of suppressing a noise of an audio signal in an electronic device according to various embodiments of the present disclosure. In an embodiment below, respective operations may be performed in sequence as well, but are not necessarily performed in sequence. For example, the order of respective operations may be changed as well, and at least two operations may be performed in parallel as well. Here, the electronic device may be the electronic device 101 of FIG. 1.

Referring to FIG. 7, in operation 701, the electronic device may acquire network connection information. According to an embodiment, a processor (e.g., the processor 120) of the electronic device may perform a negotiation procedure for call connection with another electronic device through a communication module (e.g., the communication module 190), and acquire network connection information from a signal exchanged during the negotiation procedure. According to an embodiment, the network connection information may include at least one of network connection information of the electronic device, or network connection information of another electronic device which is call connected. The network connection information may, for example, include at least one of a network kind being in access, a sampling rate, or channel information. The network kind may include, for instance, at least one of a 2-Generation (2G) network, a 3-Generation (3G) network, a WiFi network, or a voice over long term evolution (VoLTE) network, and/or a 5-Generation (5G) network.

In operation 703, the electronic device may identify at least one noise control parameter, on the basis of the network connection information. For example, the processor (e.g., the processor 120) of the electronic device may identify at least one of a parameter of a noise suppressor included in an audio module (e.g., the audio module 170) or a parameter of an automatic gain controller, on the basis of the network connection information. According to an embodiment, the processor (e.g., the processor 120) of the electronic device may search at least one noise control parameter corresponding to the network connection information, from a noise control parameter table previously stored in a memory (e.g., the memory 130). The noise control parameter table may include information of at least one noise control parameter corresponding to each network connection information. For example, the processor (e.g., the processor 120) of the electronic device may acquire at least one noise control parameter corresponding to a network kind of another electronic device that is in call connection with the electronic device, from the noise control parameter table. For another example, the processor (e.g., the processor 120) of the electronic device may acquire at least one noise control parameter corresponding to a network kind of the electronic device (e.g., the electronic device 101) and a network kind of another electronic device that is in call connection, from the noise control parameter table. For yet another example, the processor (e.g., the processor 120) of the electronic device may acquire at least one noise control parameter corresponding to a network kind, sampling rate or channel information of another electronic device that is in call connection with the electronic device from the noise control parameter table.

In operation 705, the electronic device may receive an audio signal from another electronic device that is in call connection. For example, the processor (e.g., the processor 120) of the electronic device may receive an audio signal from another electronic device that is in call connection, through a communication module (e.g., the communication module 190). The received audio signal may include a network noise. The network noise may be a noise that is formed by a negotiation policy of a service provider on an audio codec, or a transcoding noise.

In operation 707, the electronic device may suppress a noise in the audio signal, on the basis of the identified noise control parameter. According to an embodiment, the processor (e.g. the processor 120) of the electronic device may control an audio module (e.g., the audio module 170) to suppress the noise of the received audio signal, on the basis of the noise control parameter identified in operation 703. For example, in response to a parameter of the noise suppressor being identified on the basis of the network connection information, the processor (e.g., the processor 120) of the electronic device may apply the identified parameter of the noise suppressor to the noise suppressor, to suppress the network noise included in the audio signal. For another example, in response to the parameter of the noise suppressor and a parameter of the automatic gain controller being identified on the basis of the network connection information, the processor (e.g., the processor 120) of the electronic device my apply the identified parameter of the noise suppressor to the noise suppressor, to suppress the network noise included in the audio signal, and may apply the identified parameter of the automatic gain controller to the automatic gain controller, to restrict an output amplitude of the audio signal.

Figure 8:
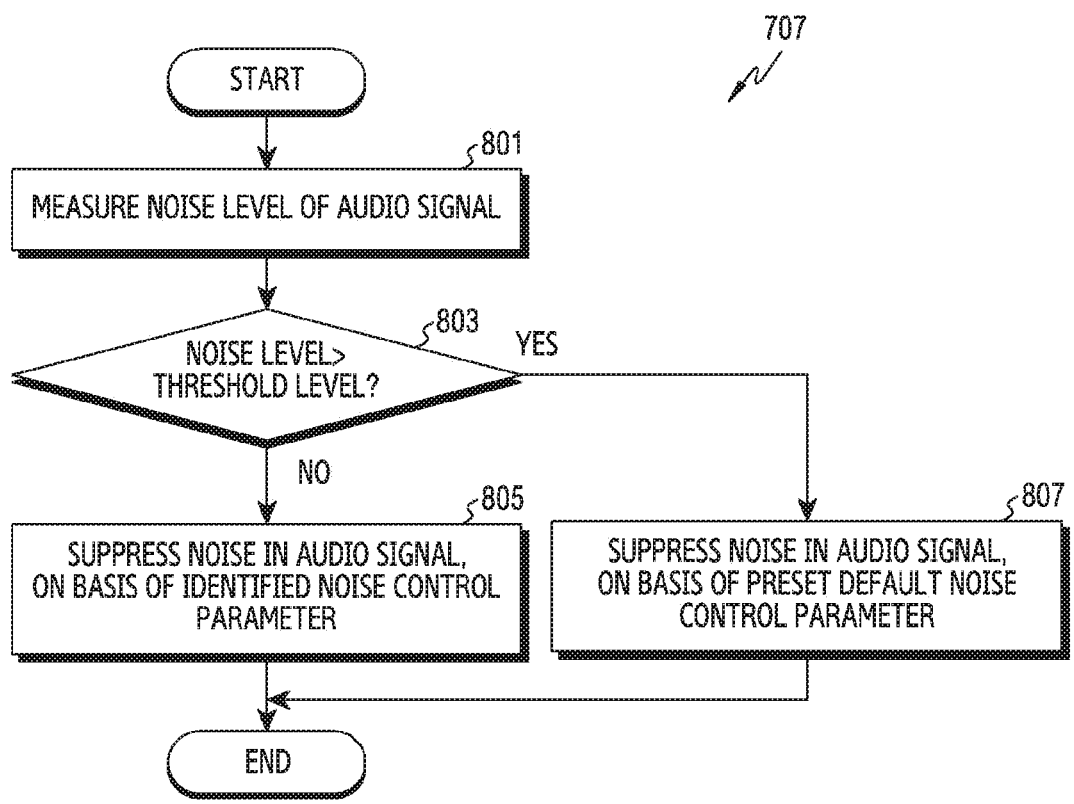
FIG. 8 is a flowchart of suppressing a noise on the basis of a noise level of an audio signal in an electronic device according to various embodiments of the present disclosure.

FIG. 8 is a flowchart of suppressing a noise on the basis of a noise level of an audio signal in an electronic device according to various embodiments of the present disclosure. The following description is made in detail for operation 707 of FIG. 7. In an embodiment below, respective operations may be performed in sequence as well, but are not necessarily performed in sequence. For example, the order of respective operations may be changed as well, and at least two operations may be performed in parallel as well. Here, the electronic device may be the electronic device 101 of FIG. 1.

Referring to FIG. 8, in operation 801, the electronic device may measure a noise level of an audio signal. According to an embodiment, a processor (e.g., the processor 120) of the electronic device may measure the noise level of the audio signal, by using an audio signal processor (e.g., the audio signal processor 240) included in an audio module (e.g., the audio module 170). By using the audio signal processor (e.g., the audio signal processor 240), the processor (e.g., the processor 120) of the electronic device may divide the audio signal into a voice signal section and a noise signal section, and measure a noise level of the noise signal section. The processor (e.g., the processor 120) of the electronic device may measure the noise level on the basis of at least one of an energy level of the noise signal section or a frequency characteristic.

In operation 803, the electronic device may identify whether the noise level of the audio signal is greater than a preset threshold level. For example, the processor (e.g., the processor 120) of the electronic device may compare the measured noise level of the audio signal and the preset threshold level. According to an embodiment, in response to the measured noise level of the audio signal being greater than the preset threshold level, the processor (e.g., the processor 120) of the electronic device may identify that the type of a corresponding noise signal section is a near-end noise. According to an embodiment, in response to the measured noise level of the audio signal being less than or being equal to the preset threshold level, the processor (e.g., the processor 120) of the electronic device may identify that the type of the corresponding noise signal section is a network noise.

In response to the measured noise level of the audio signal being less than or being equal to the preset threshold level, in operation 805, the electronic device may suppress a noise in the audio signal, on the basis of a noise control parameter identified. According to an embodiment, in response to the measured noise level of the audio signal being less than or being equal to the preset threshold level, the processor (e.g., the processor 120) of the electronic device may identify that the type of the corresponding noise signal section is the network noise. To suppress the network noise, the processor (e.g., the processor 120) of the electronic device may use a noise control parameter that is identified on the basis of network connection information. For example, to suppress the network noise in the corresponding noise signal section of the audio signal, the processor (e.g., the processor 120) of the electronic device may control such that the audio module (e.g., the audio module 170) is operated using the noise control parameter identified on the basis of the network connection information. For instance, the processor (e.g., the processor 120) of the electronic device may suppress the network noise in the corresponding noise signal section of the audio signal, by controlling to apply the noise control parameter identified on the basis of the network connection information to at least one of a noise suppressor or automatic gain controller included in the audio module (e.g., the audio module 170).

In response to the measured noise level of the audio signal being greater than the preset threshold level, in operation 807, the electronic device may suppress a noise in the audio signal, on the basis of the default noise control parameter. According to an embodiment, in response to the measured noise level of the audio signal being greater than the preset threshold level, the processor (e.g., the processor 120) of the electronic device may identify that the type of a corresponding noise signal section is a near-end noise. To suppress the near-end noise, the processor (e.g., the processor 120) of the electronic device may use a preset default noise control parameter. The near-end noise may refer to a noise inputted to a microphone of another electronic device that is in call connection. For example, to suppress the near-end noise in the corresponding noise signal section of the audio signal, the processor (e.g., the processor 120) of the electronic device may control such that the audio module (e.g., the audio module 170) is operated using the default noise control parameter. For instance, the processor (e.g., the processor 120) of the electronic device may suppress the near-end noise in the corresponding section of the audio signal, by controlling to apply the default noise control parameter to at least one of a noise suppressor or automatic gain controller included in the audio module (e.g., the audio module 170).

According to various embodiments of the present disclosure, a method for operating in an electronic device may include acquiring network connection information of an external electronic device which is call connected, identifying at least one noise control parameter, on the basis of the acquired network connection information, receiving an audio signal from the external electronic device, and suppressing a noise in the audio signal, on the basis of the identified at least one noise control parameter.

According to various embodiments of the present disclosure, the network connection information of the external electronic device may include at least one of a network kind, a sampling rate, or channel information.

According to various embodiments of the present disclosure, the method may further include performing a negotiation procedure for call connection with the external electronic device, through a wireless communication circuit. The network connection information of the external electronic device may be acquired from at least one signal which is transmitted and/or received during the negotiation procedure.

According to various embodiments of the present disclosure, the at least one noise control parameter may include at least one of a parameter for noise suppression or a parameter for automatic gain control.

According to various embodiments of the present disclosure, identifying the at least one noise control parameter may include identifying, as the at least one noise control parameter, at least one of a plurality of noise control parameters corresponding to a plurality of network connection information stored in the electronic device.

According to various embodiments of the present disclosure, suppressing the noise may include dividing the audio signal received from the external electronic device, into a voice section and a noise signal section, measuring a noise level of the noise signal section, and in response to the measured noise level satisfying a given level, suppressing a noise in the audio signal, on the basis of the at least one noise control parameter.

According to various embodiments of the present disclosure, suppressing the noise may further include, in response to the measured noise level not satisfying the given level, suppressing the noise in the audio signal, on the basis of a preset default noise control parameter.

According to various embodiments of the present disclosure, the at least one noise control parameter may be identified on the further basis of network connection information of the electronic device.

According to various embodiments of the present disclosure, a computer-readable recording medium may include a program for executing acquiring network connection information of an external electronic device which is call connected, identifying at least one noise control parameter, on the basis of the acquired network connection information, receiving an audio signal from the external electronic device, and suppressing a noise in the audio signal, on the basis of the identified at least one noise control parameter.

According to various embodiments of the present disclosure, the network connection information of the external electronic device may include at least one of a network kind, a sampling rate, or channel information.

According to various embodiments of the present disclosure, the at least one noise control parameter may include at least one of a parameter for noise suppression or a parameter for automatic gain control.

According to various embodiments of the present disclosure, suppressing the noise may include dividing the audio signal received from the external electronic device, into a voice section and a noise signal section, measuring a noise level of the noise signal section, and in response to the measured noise level satisfying a given level, suppressing a noise in the audio signal, on the basis of the at least one noise control parameter.

What is claimed is:

1. An electronic device comprising:
   a wireless communication circuit; and
   a processor,
   wherein the processor is configured to:
      acquire network connection information of an external electronic device which is call connected, through the wireless communication circuit;
      identify at least one noise control parameter, on the basis of the acquired network connection information;
      receive an audio signal from the external electronic device, through the wireless communication circuit;
      divide the audio signal received from the external electronic device into a voice section and a noise section;
      measure a noise level of the noise section; and
      in response to the noise level satisfying a given level, suppress a noise in the audio signal, on the basis of the identified at least one noise control parameter.

2. The electronic device of claim 1, wherein the network connection information of the external electronic device comprises at least one of a network kind, a sampling rate, or channel information.

3. The electronic device of claim 1, wherein the processor is configured to:
   perform a negotiation procedure for call connection with the external electronic device, through the wireless communication circuit, and
   acquire the network connection information of the external electronic device from at least one signal which is transmitted and/or received during the negotiation procedure.

4. The electronic device of claim 1, wherein the at least one noise control parameter comprises at least one of a parameter for noise suppression or a parameter for automatic gain control.

5. The electronic device of claim 1, further comprising a memory,
   wherein the processor is configured to identify, as the at least one noise control parameter, at least one of a plurality of noise control parameters corresponding to a plurality of network connection information stored in the memory.

6. The electronic device of claim 1, wherein the processor is configured to, in response to the noise level not satisfying the given level, suppress the noise in the audio signal, on the basis of a preset default noise control parameter.

7. The electronic device of claim 1, wherein the processor is configured to identify the at least one noise control parameter, on the further basis of network connection information of the electronic device.

8. A method for operating in an electronic device, the method comprising:
   acquiring network connection information of an external electronic device which is call connected;
   identifying at least one noise control parameter, on the basis of the acquired network connection information;
   receiving an audio signal from the external electronic device;
   dividing the audio signal received from the external electronic device into a voice section and a noise section;
   measuring a noise level of the noise section; and
   in response to the measured noise level satisfying a given level, suppressing a noise in the audio signal, on the basis of the identified at least one noise control parameter.

9. The method of claim 8, wherein the network connection information of the external electronic device comprises at least one of a network kind, a sampling rate, or channel information.

10. The method of claim 8, further comprising performing a negotiation procedure for call connection with the external electronic device, through a wireless communication circuit,
    wherein the network connection information of the external electronic device is acquired from at least one signal which is transmitted and/or received during the negotiation procedure.

11. The method of claim 8, wherein the at least one noise control parameter comprises at least one of a parameter for noise suppression or a parameter for automatic gain control.

12. The method of claim 8, wherein identifying the at least one noise control parameter comprises identifying, as the at least one noise control parameter, at least one of a plurality of noise control parameters corresponding to a plurality of network connection information stored in the electronic device.

13. The method of claim 8, wherein suppressing the noise further comprises, in response to the measured noise level not satisfying the given level, suppressing the noise in the audio signal, on the basis of a preset default noise control parameter.

14. The method of claim 8, wherein the at least one noise control parameter is identified on the further basis of network connection information of the electronic device.

15. A non-transitory computer-readable recording medium recording a program for executing:
    acquiring network connection information of an external electronic device which is call connected;
    identifying at least one noise control parameter, on the basis of the acquired network connection information;
    receiving an audio signal from the external electronic device;
    dividing the audio signal received from the external electronic device into a voice section and a noise section;
    measuring a noise level of the noise section; and
    in response to the measured noise level satisfying a given level, suppressing a noise in the audio signal, on the basis of the identified at least one noise control parameter.

16. The non-transitory computer-readable recording medium of claim 15, wherein the network connection information of the external electronic device comprises at least one of a network kind, a sampling rate, or channel information.

17. The non-transitory computer-readable recording medium of claim 15, wherein the at least one noise control parameter comprises at least one of a parameter for noise suppression or a parameter for automatic gain control.

* * * * *